(12) United States Patent
Tonti et al.

(10) Patent No.: US 7,776,978 B2
(45) Date of Patent: *Aug. 17, 2010

(54) PROCESS FOR PRODUCING FRACTIONABLE 1-BUTENE POLYMERS

(75) Inventors: Maria Silvia Tonti, Ferrara (IT); Luigi Resconi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 311 days.

This patent is subject to a terminal disclaimer.

(21) Appl. No.: 11/632,612

(22) PCT Filed: Jun. 10, 2005

(86) PCT No.: PCT/EP2005/052690

§ 371 (c)(1),
(2), (4) Date: Jan. 16, 2007

(87) PCT Pub. No.: WO2006/008212

PCT Pub. Date: Jan. 26, 2006

(65) Prior Publication Data

US 2008/0027190 A1 Jan. 31, 2008

Related U.S. Application Data

(60) Provisional application No. 60/592,346, filed on Jul. 28, 2004, provisional application No. 60/652,184, filed on Feb. 10, 2005.

(30) Foreign Application Priority Data

Jul. 22, 2004 (EP) .................................. 04103525
Jan. 24, 2005 (EP) .................................. 05100415

(51) Int. Cl.
C08F 4/622 (2006.01)
C08F 4/625 (2006.01)
C08F 4/6392 (2006.01)
C08F 4/642 (2006.01)
C08F 4/6592 (2006.01)
B01J 31/12 (2006.01)
B01J 31/22 (2006.01)

(52) U.S. Cl. ..................... 526/116; 526/160; 526/161; 526/165; 526/348.6; 526/943; 502/113; 502/155

(58) Field of Classification Search ................. 526/116, 526/160, 161, 165, 348.6, 943; 502/113, 502/155

See application file for complete search history.

(56) References Cited

U.S. PATENT DOCUMENTS

| 3,671,663 | A | 6/1972 | Seifert et al. |
|---|---|---|---|
| 3,894,120 | A | 7/1975 | Frese et al. |
| 4,298,722 | A | 11/1981 | Collette et al. |
| 5,852,143 | A | 12/1998 | Sishta et al. |
| 6,288,192 | B1 | 9/2001 | Fujita et al. |
| 6,359,095 | B1 | 3/2002 | Winter et al. |
| 6,444,833 | B1 | 9/2002 | Ewen et al. |
| 6,900,343 | B1 | 5/2005 | Bingel et al. |
| 6,953,829 | B2 | 10/2005 | Kratzer et al. |
| 7,101,940 | B2 | 9/2006 | Schottek et al. |
| 2002/0123538 | A1 | 9/2002 | Zhou et al. |
| 2006/0235173 | A1 | 10/2006 | Resconi |
| 2008/0319135 | A1 | 12/2008 | Resconi et al. |

FOREIGN PATENT DOCUMENTS

| DE | 19962814 | 6/2001 |
|---|---|---|
| DE | 19962910 | 7/2001 |
| DE | 10324541 | 12/2004 |
| EP | 172961 | 3/1986 |
| EP | 604908 | 7/1994 |
| EP | 930320 | 7/1999 |
| WO | 91/02012 | 2/1991 |
| WO | 92/00333 | 1/1992 |
| WO | 99/21899 | 5/1999 |
| WO | 99/45043 | 9/1999 |
| WO | 00/31089 | 6/2000 |
| WO | 01/21674 | 3/2001 |
| WO | 01/44318 | 6/2001 |
| WO | 01/62764 | 8/2001 |
| WO | 02/02576 | 1/2002 |
| WO | 02/100908 | 12/2002 |
| WO | 02/100909 | 12/2002 |
| WO | 03/014107 | 2/2003 |
| WO | 03/045964 | 6/2003 |
| WO | 03/099883 | 12/2003 |
| WO | 2004/050713 | 6/2004 |
| WO | 2004/106351 | 12/2004 |
| WO | 2005/095468 | 10/2005 |
| WO | 2005/105865 | 11/2005 |
| WO | 2006/008211 | 1/2006 |

OTHER PUBLICATIONS

L. Resconi et al., "1-Olefin Polymerization at Bis(pentamethylcyclopentadienyl)zirconium and -hafnium Centers: Enantioface Selectivity," *Macromolecules*, vol. 25(25), p. 6814-6817 (1992).

M. Vathauer et al., "Homopolymerizations of α-Olefins with Diastereomeric Metallocene/MAO Catalysts," *Macromolecules*, vol. 33(6), p. 1955-1959 (2000).

Q. Huang et al., "Synthesis and Characterization of High Molecular Weight Atactic Polybutene-1 with a Monotitanocene/ Methylaluminoxane Catalyst System," *Journal of Polymer Science: Part A: Polymer Chemistry*, vol. 39, p. 4068-4073 (2001).

F. Zhu et al., "Syntheses of Multi-stereoblock Polybutene-1 Using Novel Monocyclopentadienyl-titanium and Modified Methylaluminoxane Catalysts," *Journal of Polymer Science: Part A: Polymer Chemistry*, vol. 37, p. 4497-4501 (1999).

Q. Huang et al., "The synthesis of high molecular weight polybutene-1 catalyzed by Cp★Ti(OBz)₃/MAO," *Polymer International*, vol. 50, p. 45-48 (2001).

A. Nishioka et al., "Crystallinity and Stereoregularity of Polybutene-1," *Chem. of High Polymers (Japan)*, vol. 19, p. 667-671 (1962).

N. Naga et al., "Polymerization behavior of α-olefins with *rac*- and *meso*-type *ansa*-metallocene catalysts: Effects of cocatalyst and metallocene ligand," *Macromol. Chem. Phys.*, vol. 200, p. 1587-1594 (1999) (XP-002344858).

M. Vathauer, "Homo- und Copolymerisationen von Propen und höheren α-Olefinen mit verbrückten α-Olefinen mit verbrückten C₂-symmetrischen Bisindenylzirconocenen," University of Hamburg Dissertation, p. 25-26 (2000) (XP-002345008).

*Primary Examiner*—Caixia Lu
(74) *Attorney, Agent, or Firm*—William R. Reid

(57) ABSTRACT

A process for producing a 1-butene polymer comprising the step of polymerizing 1-butene in the presence of a catalyst system obtainable by contacting:

b) at least a metallocene compound of formula (Ia) in the meso or meso-like form:

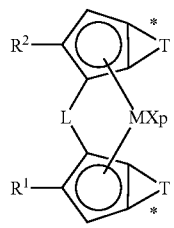

(Ia)

wherein M is an atom of a transition metal p is an integer from 0 to 3, X, same or different, is a hydrogen atom, a halogen atom, or a hydrocarbon group. L is a divalent $C_1$-$C_{40}$ hydrocarbon radical $R^1$ and $R^2$, equal to or different from each other, are $C_1$-$C_{40}$ hydrocarbon radicals; T, equal to or different from each other, is a moiety of formula (IIa), (IIb) or (IIc):

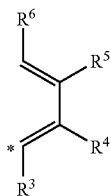

(IIa)

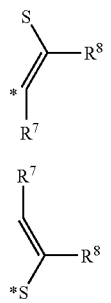

(IIb)

(IIc)

wherein $R^3$ and $R^5$ are a $C_1$-$C_{40}$ hydrocarbon radical; $R^4$ and $R^6$, equal to or different from each other, are hydrogen atoms or $C_1$-$C_{40}$ hydrocarbon radicals and $R^7$ and $R^8$, equal to or different from each other, are hydrogen atoms or $C_1$-$C_{40}$ hydrocarbon radicals b) at least a metallocene compound of formula (Ib) in the racemic (rac) or racemic-like form

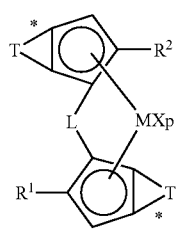

(Ib)

c) an alumoxane or a compound capable of forming an alkyl metallocene cation.

12 Claims, No Drawings

PROCESS FOR PRODUCING FRACTIONABLE 1-BUTENE POLYMERS

This application is the U.S. national phase of International Application PCT/EP2005/052690, filed Jun. 10, 2005, claiming priority to European Patent Application 04103525.4 filed Jul. 22, 2004, and European Patent Application 05100415.8 filed Jan. 24, 2005, and the benefit under 35 U.S.C. 119(e) of U.S. Provisional Application No. 60/592,346, filed Jul. 28, 2004 and U.S. Provisional Application No. 60/652,184 filed Feb. 10, 2005; the disclosures of International Application PCT/EP2005/052690, European Patent Applications 04103525.4 and 05100415.8 and U.S. Provisional Application Nos. 60/592,346 and 60/652,184, each as filed, are incorporated herein by reference.

The present invention relates to a process for obtaining a fractionable 1-butene-based polymer by using a metallocene-base catalyst system and to the polymer directly obtainable by this process.

1-Butene polymers are well known in the art. In view of their good properties in terms of pressure resistance, creep resistance, and impact strength, they are widely used for example in the manufacture of pipes for metal pipe replacement, easy-open packaging and films. Isotactic 1-butene based polymers produced by using metallocene-based catalyst system are well known in the art, processes for obtaining them are described for example in WO 02/100908, WO 02/100909 and WO 03/014107, however the polymers obtainable are endowed with a very high isotacticity.

From the other side atactic 1-butene polymers are known in the art, it is a sticky polymer mainly used as components for adhesive compositions. Examples of processes for producing this polymers are given in U.S. Pat. No. 6,288,192; EP 604 908 and EP 04101912.6. For certain applications there is the need for a material softer than the isotactic 1-butene polymer, having elastomeric properties, but this material has to be easily processable and above all not sticky as the atactic 1-butene polymers are.

A fractionable elastomeric 1-butene polymers is described in U.S. Pat. No. 4,298,722. This polymer is obtained by using organozirconium compounds such as tetraneophylzirconium, i.e. compounds in which the metal do not have n-bond as metallocene compounds have. The obtained 1-butene polymer can be fractionated with diethyl ether and the ether soluble fractions among other features has an infrared crystallinity value comprised between 1% to 15%. This value is quite high if compared with the infrared crystallinity of the ether soluble fraction of the 1-butene polymers of the present invention.

In macromolecules Vol 33. No. 6, 2000 a process for preparing a 1-butene homopolymer is described. The process uses rac and meso mixtures of dimethylsilylbis(2-methyl-4-phenylindenyl)zirconium dichloride, dimethylsilylbis(indenyl) zirconium dichloride, or dimethylsilylbis(2-methyl-4,5-benzoindenyl) zirconium dichloride. The molecular weight of the atactic 1-butene polymer are quite low they ranges from 200 kg/mol to 40 kg/mol, that corresponds to an intrinsic viscosity measured in decahydronapthalene ranging from 0.95 dl/g to 0.27 dl/g according to the parameters of the Mark-Houwink equation described in the document itself. These values correspond to an intrinsic viscosity (IV) range measured in tetrahydronaphtalene from about 0.83 dl/g to 0.23 dl/g. In the 1-butene polymer composition of the present invention the intrinsic viscosity of the 1-butene polymer is higher than the value of 0.83 dl/g described in said document. The higher molecular weight (i.e. the higher value of intrinsic viscosity) renders the composition less sticky making the latter easier to process. An object of the present invention is to find a process for preparing a fractionable 1-butene-based polymer wherein the atactic fraction of such a polymer has an high molecular weight, and it is atactic, while the isotactic fraction has an high molecular weight, and wherein the molecular weight of the atactic fraction is higher than 70% of the molecular weight of the isotactic fraction.

Therefore the applicant found a process for producing a 1-butene polymer comprising the step of polymerizing 1-butene and optionally ethylene, propylene or one or more alpha olefins of formula $CH_2=CHZ$, wherein Z is a $C_3$-$C_{10}$ alkyl group, in the presence of a catalyst system obtainable by contacting:

a) at least a metallocene compound of formula (Ia) in the meso or meso-like form:

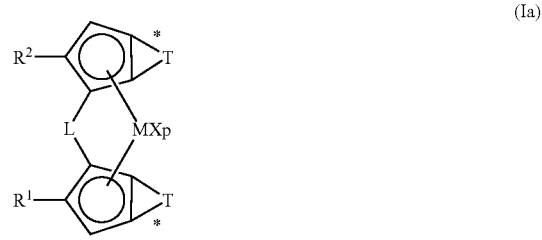

wherein

M is an atom of a transition metal selected from those belonging to group 3, 4, 5, 6 or to the lanthanide or actinide groups in the Periodic Table of the Elements; preferably M is titanium, zirconium or hafnium;

p is an integer from 0 to 3, preferably p is 2, being equal to the formal oxidation state of the metal M minus 2;

X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or benzyl radicals;

L is a divalent $C_1$-$C_{40}$ hydrocarbon radical optionally containing heteroatoms belonging to groups 13-17 of the Periodic Table of the Elements or a divalent silylene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylene radical containing up to 5 silicon atoms such as $SiMe_2$, $SiPh_2$; preferably L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements; preferably R'' is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_1$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, $SiPhMe$, $SiMe(SiMe_3)$, $CH_2$, $(CH_2)_2$, and $C(CH_3)_2$;

$R^1$ and $R^2$, equal to or different from each other, are $C_1$-$C_{40}$ hydrocarbon radicals optionally containing heteroatoms belonging to groups 13-17 of the Periodic Table of the Elements; preferably they are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ and $R^2$ are linear, saturated or unsaturated $C_1$-$C_{20}$-alkyl radicals; more preferably R' and $R^2$ are methyl or ethyl radicals;

T, equal to or different from each other, is a moiety of formula (IIa), (IIb) or (IIc):

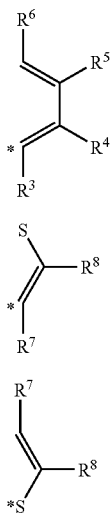

(IIa)

(IIb)

(IIc)

wherein the atom marked with the symbol * bonds the atom marked with the same symbol in the compound of formula (Ia);

$R^3$ is a $C_1$-$C_{40}$ hydrocarbon radical optionally containing heteroatoms belonging to groups 13-17 of the Periodic Table of the Elements; preferably $R_3$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-arylalkyl or a $C_7$-$C_{40}$-alkylaryl radical; optionally containing heteroatoms belonging to groups 13-17 of the Periodic Table of the Elements; more preferably $R^3$ is a linear or branched, $C_1$-$C_{20}$-alkyl $C_6$-$C_{40}$-aryl, $C_7$-$C_{40}$-arylalkyl radical; even more preferably $R^3$ is a $C_6$-$C_{20}$-aryl radical optionally substituted with one or more $C_1$-$C_{10}$ alkyl groups;

$R^4$ and $R^6$, equal to or different from each other, are hydrogen atoms or $C_1$-$C_{40}$ hydrocarbon radicals optionally containing heteroatoms belonging to groups 13-17 of the Periodic Table of the Elements; preferably $R^4$ and $R^6$, equal to or different from each other, are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably $R^4$ and $R^6$ are hydrogen atoms;

$R^5$ is a $C_1$-$C_{40}$ hydrocarbon radical optionally containing heteroatoms belonging to groups 13-17 of the Periodic Table of the Elements; preferably $R^5$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^5$ is a linear or branched, saturated or unsaturated $C_1$-$C_{20}$-alkyl radical; even more preferably $R^5$ is a methyl or ethyl radical;

$R^7$ and $R^8$, equal to or different from each other, are hydrogen atoms or $C_1$-$C_{40}$ hydrocarbon radicals optionally containing heteroatoms belonging to groups 13-17 of the Periodic Table of the Elements; preferably $R^7$ and $R^8$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

preferably $R^8$ is a hydrogen atom or a linear or branched, saturated or unsaturated $C_1$-$C_{20}$-alkyl radical; more preferably $R^8$ is a methyl or ethyl radical;

preferably $R^7$ is a hydrogen atom or a $C_1$-$C_{40}$-alkyl, $C_6$-$C_{40}$-aryl or a $C_7$-$C_{40}$-arylalkyl radical; more preferably $R^7$ is a group of formula (III)

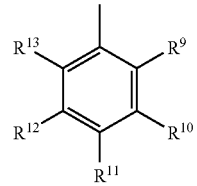

(III)

wherein $R^9$, $R^{10}$, $R^{11}$, $R^{12}$ and $R^{13}$, equal to or different from each other, are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; optionally containing heteroatoms belonging to groups 13-17 of the Periodic Table of the Elements; preferably $R^9$, and $R^{12}$ are a hydrogen atoms; $R^{10}$, $R^{11}$ and $R^{13}$ are preferably hydrogen atoms or linear or branched, cyclic or acyclic, $C_1$-$C_{10}$-alkyl radicals;

b) at least a metallocene compound of formula (Ib) in the racemic (rac) or racemic-like form

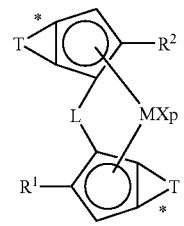

(Ib)

wherein $R^1$, $R^2$, T, L, M, X and p have been described above; and wherein $R^1$, $R^2$, T, L, M, X and p have been described above; and wherein the atoms marked with the symbol * bonds the atom marked with the same symbol in the moieties of formula (IIa), (IIb) or (IIc)

c) an alumoxane or a compound capable of forming an alkyl metallocene cation; and optionally
d) an organo aluminum compound.

Preferably the ratio between the racemic or the racemic like form (the compound of formula (Ib)) and the meso form or the meso-like form (the compound of formula (Ia)) ranges from 10:90 to 90:10; more preferably from 20:80 to 80:20; even more preferably from 30:70; 70:30.

In one embodiment the compounds of formulas (Ia) and (Ib) have respectively the following formulas (IVa) or (IVb)

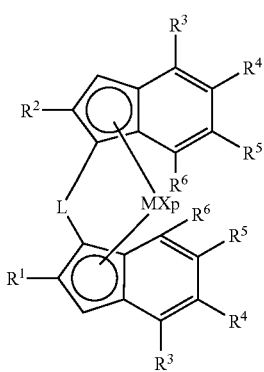

(IVa)

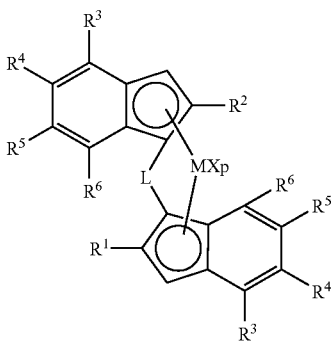

(IVb)

wherein

M, X, p, L, $R^1$, $R^2$, $R^3$, $R^4$, $R^5$ and $R^6$ have the above described meaning.

In an alternative embodiment the compounds of formulas (Ia) and (Ib) have respectively the following formulas (Va) or (Vb)

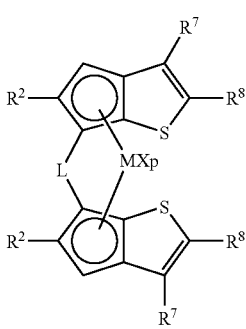

(Va)

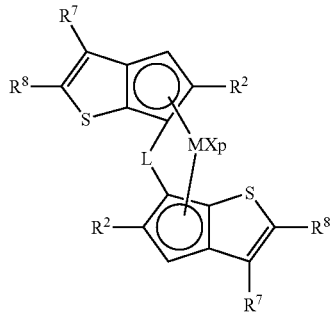

(Vb)

wherein M, X, p, L, $R^1$, $R^2$, $R^7$ and $R^8$ have the above described meaning.

Metallocene compounds of formula (Ia) and (Ib) are well known in the art, they can be prepared according to known procedure, such as those described in WO 01/44318, WO 03/045964, PCT/EP02/13552 and DE 10324541.3.

For the purpose of the present invention the term "racemic form" means that the same substituents on the two cyclopentadienyl moieties are on the opposite side with respect to the plane containing the zirconium and the centre of the said cyclopentadienyl moieties. "racemic-like form" means that the bulkier substituents of the two cyclopentadienyl moieties on the metallocene compound are on the opposite side with respect to the plane containing the zirconium and the centre of the said cyclopentadienyl moieties as shown in the following compound:

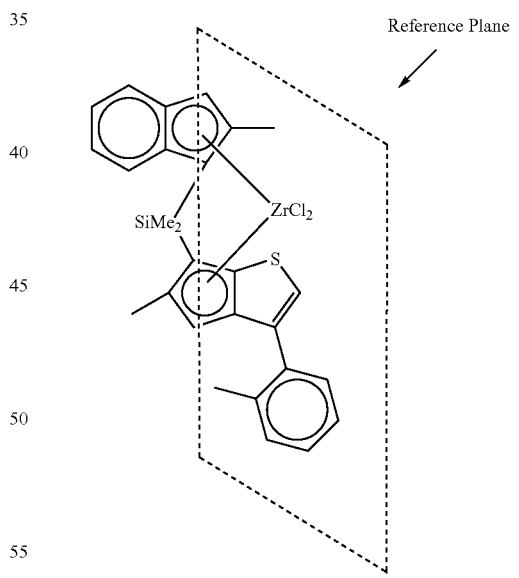

For the purpose of the present invention the term "meso form" means that the same substituents on the two cyclopentadienyl moieties are on the same side with respect to the plane containing the zirconium and the centre of the said cyclopentadienyl moieties. "Meso-like form" means that the bulkier substituents of the two cyclopentadienyl moieties on the metallocene compound are on the same side with respect to the plane containing the zirconium and the centre of the said cyclopentadienyl moieties as shown in the following compound:

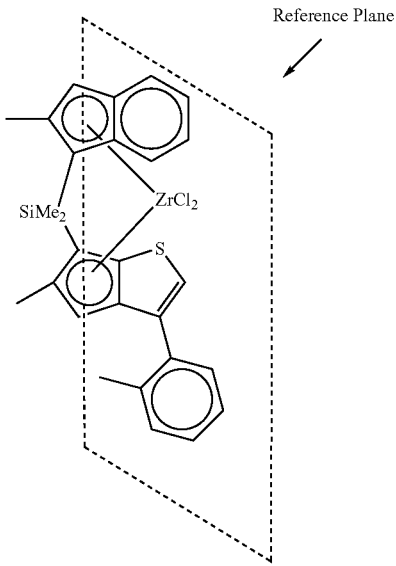

The 1-butene polymer composition object of the present invention can be easily fractionated by subjecting the composition to fractionation with xylene according to the procedure described below (Xylene solubles at 0° C.). In this way the atactic component a) remains in solution, while the isotactic component b) is insoluble at 0° C.

When the composition is subjected to diethyl ether extraction the atactic component a) that taken alone results to be completely soluble in this solvent, cannot be completely separated from component b). Without wishing to be bound by a theory we believe that this can be explained by the fact that component a) and component b) are so intimately mixed that diethyl ether is not able to swell the component b) lamellas so that to be able to contact and solubilize all the component a) present in the composition. On the contrary when the composition is subjected to xylene fractionation according to the procedure described below, since all the composition is solubilized, with a subsequent precipitation of component a) the separation is complete.

This fact confirms that component a) and component b) of the 1-butene polymer obtainable with the process of the present invention are completely intimately dispersed allowing the composition to maintain the best properties of the two components. In fact, for example, the composition retains the melting point of component b).

The 1-butene polymer obtainable with the process of the present invention is endowed with a very narrow molecular weight distribution, even if it is composed by two distinguishable fractions. The molecular weight distribution (Mw/Mn) of said 1-butene polymer is lower than 4; preferably it is lower than 3; more preferably it is lower than 2.5.

Component a) as obtained by xylene extraction at 0° C. has preferably an infrared crystallinity value lower than 0.5%; more preferably the infrared crystallinity is lower than 0.3%; even more preferably lower than 0.1%.

The amount of component a) with respect to component b) in the 1-butene polymer obtainable with the process of the present invention depends mainly on the ratio between the racemic or racemic-like form and the meso or meso-like form and to the polymerization activities of compounds (Ia) and (Ib). Thus once it is known the polymerization activity of compound (Ia) and (Ib) the desired ratio between component a) and component b) can be easily found by calculating the ratio of compounds of formula (Ia) and (Ib). A further advantage of the process of the present invention is that the polymerization activities of the compounds of formulas (Ia) and (Ib) when they are the meso or meso-like form and the rac or racemic-like form of the same metallocene compound are comparable. Therefore it is possible to achieve the whole range of ratio between component a) and component b) i.e. for example from 95:5 to 5:95 without having a substantial decrease of the yield of the polymerisation process. This effect is unexpected with respect to the prior art. In fact, in macromolecules Vol. 33. No. 6, 2000 the activities of the rac and meso form of the metallocene compounds used are very different and the meso form is much more active than the rac form, therefore, for example in order to have a composition rich in the isotactic 1-butene polymer it would be necessary to use a catalyst system that is much more rich in racemic form with a consequently lowering of the yield of the polymerization process.

In the process of the present invention the ratio of component a) to component b), can be also finely tuned by using hydrogen or ethylene during the polymerization reaction.

In fact, by adding hydrogen it is possible to increase the amount of component a) by increasing the lifetime and/or activity of the compound of formula (Ia) while the compound of formula (Ib) is less affected. A similar effect can also be obtained by using ethylene instead of hydrogen.

Therefore a further object of the present invention is a process for producing a 1-butene polymer comprising the step of polymerizing 1-butene and optionally ethylene, propylene or one or more alpha olefins of formula $CH_2=CHZ$, wherein Z is a $C_3$-$C_{10}$ alkyl group, in the presence of a catalyst system described above; wherein said process is carried out in the presence of hydrogen or ethylene.

The amount of hydrogen can range from 1 ppm to 1000 ppm; preferably it ranges from 5 ppm to 500 ppm; more preferably it ranges from 10 ppm to 400 ppm; even more preferably the amount of hydrogen ranges from 20 ppm to 200 ppm; another preferred range is from 30 ppm to 100 ppm, wherein ppm are defined as molar part per million in the liquid phase (bulk). The ratio of 1-butene to ethylene fed in the reactor can be varied in order to obtain a fractionable 1-butene polymer containing from 0.1% by mol and 8% by mol; more preferably it is comprised between 0.1% by mol and 5% by mol, even more preferably it is comprised between 0.1% by mol and 3% by mol of ethylene.

Alumoxanes used as component c) in the above process can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

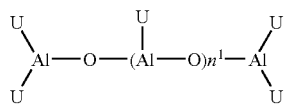

can be used in the case of linear compounds, wherein $n^1$ is 0 or an integer of from 1 to 40 and the substituents U are defined as above; or alumoxanes of the formula:

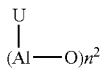

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethyl butyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl] aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Among the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (Ia) and (Ib) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and N,N-Dimethylaniliniumtetrakis(pentafluorophenyl)borate.

Organic aluminum compounds used as compound d) are those of formula $H_jAlU_{3-j}$ or $H_jAl_2U_{6-j}$ as described above.

The polymerization process of the present invention can be carried out in liquid phase, optionally in the presence of an inert hydrocarbon solvent. Said hydrocarbon solvent can be either aromatic (such as toluene) or aliphatic (such as propane, hexane, heptane, isobutane, cyclohexane and 2,2,4-trimethylpentane). Preferably, the polymerization process of the present invention is carried out by using liquid 1-butene as polymerization medium optionally in the presence of ethylene, propylene or one or more alpha olefins of formula $CH_2=CHZ$, wherein Z is a $C_3$-$C_{10}$ alkyl group in an amount ranging from 0 to 50% by weight; preferably from 0 to 40% by weight; more preferably from 0 to 30% by weight.

The polymerization temperature preferably ranges from 20° C. and 150° C., even more preferably between 40° C. and 90° C.; particularly preferred ranges is from 50° C. to 80° C. Preferably in the process of the present invention 1-butene homopolymer is produced.

With the process of the present invention it is also possible to obtain either a 1-butene homopolymer or a 1-butene copolymer, containing derived units of alpha olefins selected from ethylene, propylene or one or more alpha olefins of formula $CH_2=CHZ$, wherein Z is a $C_3$-$C_{10}$ alkyl group. The content of derived units of ethylene, propylene or one or more alpha olefins of formula $CH_2=CHZ$ is up to 10% by mol; preferably it ranges from 0.1% by mol and 10% by mol; more preferably it is comprised between 0.1% by mol and 5% by mol, even more preferably it is comprised between 0.1% by mol and 4% by mol.

Examples of alpha olefins of formula $CH_2=CHZ$ are 1-pentene, 4-methyl-1-pentene, 1-hexene, 1-octene, 4,6-dimethyl-1-heptene, 1-decene and 1-dodecene.

The 1-butene polymer obtainable with the process of the present invention is fractionable by using xylene at 0° C. according to the procedure described below. The fraction soluble in xylene at 0° C. results to be an atactic homopolymer or an atactic 1-butene copolymer, containing derived units of alpha olefins selected from ethylene, propylene or one or more alpha olefins of formula $CH_2=CHZ$, wherein Z is a $C_3$-$C_{10}$ alkyl group as described above component a) having the following features:
  i) distribution of molecular weight Mw/Mn equal to or lower than 4;
  ii) rr triads, measured by $^{13}$C-NMR comprised between 15% and 35%;
  iii) no enthalpy of fusion detectable at a differential scanning calorimeter (DSC);
  iv) intrinsic viscosity (IV) measured in tetrahydronaphtalene (THN) at 135° C. comprised between 1.0 dl/g and 5.0 dl/g; and
  v) infrared crystallinity lower than 0.5%;

Preferably in component a) the distribution of molecular weight Mw/Mn is lower than 3; more preferably it is lower than 2.5.

In the component a) the rr triads, measured by $^{13}$C-NMR are preferably comprised between 20% and 30%.

In the component a) intrinsic viscosity (IV) measured in tetrahydronaphtalene (THN) at 135° C. is preferably comprised between 1.0 dl/g and 4.0 dl/g; preferably between 1.1 dl/g and 3.0 dl/g; more preferably between 1.1 dl/g and 2.5 dl/g.

In the component a) the infrared crystallinity is preferably lower than 0.3%; more preferably lower than 0.1%; even more preferably lower than 0.05%.

Component a) of the fractionable 1-butene polymer obtainable with the process of the present invention is endowed with a high molecular weight (IV). The intrinsic viscosity (IV) of component a) is generally higher than 70% of the intrinsic viscosity (IV) of the isotactic component b) preferably it is higher than 80% of the intrinsic viscosity (IV) of the isotactic component b). This important feature gives rise to the effect that since the stickiness of the atactic component is high, the higher molecular weight of the latter reduces considerably the stickiness of the 1-butene polymer of the present invention that therefore can be easily processed.

The fraction insoluble in xylene at 0° C. results to be an isotactic 1-butene homopolymer or a 1-butene copolymer, containing derived units of alpha olefins selected from ethylene, propylene or one or more alpha olefins of formula $CH_2=CHZ$, wherein Z is a $C_3$-$C_{10}$ alkyl group, component b) having the following features:
  i) distribution of molecular weight Mw/Mn equal to or lower than 4;
  ii) isotactic mmmm triads, measured by $^{13}$C-NMR higher than 90%;
  iii) intrinsic viscosity (IV) measured in tetrahydronaphtalene (THN) at 135° C. comprised between 1.0 dl/g and 5.0 dl/g;

Preferably in the component b) the distribution of molecular weight is lower than 3; more preferably it is lower than 2.5. The isotactic mmmm triads, measured by $^{13}$C-NMR are preferably higher than 93%, more preferably they are higher than 95%. In the component b) the intrinsic viscosity (IV) measured in tetrahydronaphtalene (THN) at 135° C. is preferably comprised between 1.0 dl/g and 4.0 dl/g; preferably between 1.1 dl/g and 3.0 dl/g; more preferably between 1.2 dl/g and 2.5 dl/g.

Preferably the fractionable 1-butene polymer contains from 5% to 95% of component a); preferably from 20% to 80% by weight; more preferably component a) ranges from 30% by weight to 70% by weight. Preferably the fractionable poly(1-butene) polymer contains from 95% to 5% of component b); preferably component b) ranges from 80% to 20% by weight; more preferably component b) ranges from 30% to 70% by weight.

The following compositions are also possible:

| component a) | component b) |
| --- | --- |
| 10-20% by weight | 90-80% by weight |
| 20-30% by weight | 80-70% by weight |
| 30-40% by weight | 70-60% by weight |
| 40-50% by weight | 60-50% by weight |
| 50-60% by weight | 50-40% by weight |
| 60-70% by weight | 40-30% by weight |
| 70-80% by weight | 30-20% by weight |
| 80-90% by weight | 20-10% by weight |

With the 1-butene polymer object of the present invention it is possible to obtain a soft new material that can be used for several applications in order to replace, for example, polyvinylchloride, polyuretane or styrene block copolymers. Moreover, components a) and b) of the fractionable 1-butene polymer object of the present invention are completely compatible allowing to obtain a very homogeneous final 1-butene polymer.

The intrinsic viscosity (I.V.) was measured in tetrahydronaphtalene (THN) at 135° C. The conversion between the intrinsic viscosity measured in tetrahydronapthalene and intrinsic viscosity measured in decahydronaphtalene (DHN) has been carried out according to the following empirical equation $$IV(THN)=0.87IV(DHN)$$

This equation has been derived by analyzing the IV measured in THN and DHN of several polybutene samples.

The melting points of the polymers ($T_m$) were measured by Differential Scanning Calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature ($T_m$) and the area of the peak as melting enthalpy ($\Delta H_f$).

Molecular weight parameters and molecular weight distribution for all the samples were measured using a Waters 150C ALC/GPC instrument (Waters, Milford, Mass., USA) equipped with four mixed-gel columns PLgel 20 μm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/dL in 1,2,4 trichlorobenzene (TCB). 0.1 g/L of 2,6-di-t-butyl-4-methyl phenol (BHT) was added to prevent degradation and the injection volume was 300 μL. All the measurements were carried out at 135° C. GPC calibration is complex, as no well-characterized narrow molecular weight distribution standard reference materials are available for 1-butene polymers. Thus, a universal calibration curve was obtained using 12 polystyrene standard samples with molecular weights ranging from 580 to 13,200,000. It was assumed that the K values of the Mark-Houwink relationship were: $K_{PS}$=1.21× $10^{-4}$, dL/g and $K_{PB}$=1.78×$10^{-4}$ dL/g for polystyrene and poly-1-butene respectively. The Mark-Houwink exponents α were assumed to be 0.706 for polystyrene and 0.725 for poly-1-butene. Even though, in this approach, the molecular parameters obtained were only an estimate of the hydrodynamic volume of each chain, they allowed a relative comparison to be made.

$^{13}$C-NMR spectra were acquired on a DPX-400 spectrometer operating at 100.61 MHz in the Fourier transform mode at 120° C. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove $^1$H-$^{13}$C coupling. About 3000 transients were stored in 32K data points using a spectral window of 6000 Hz. The isotacticity of metallocene-made PB is measured by $^{13}$C NMR, and is defined as the relative intensity of the mmmm triad peak of the diagnostic methylene of the ethyl branch. This peak at 27.73 ppm was used as internal reference. Pentad assignments are given according to *Macromolecules*, 1992, 25, 6814-6817. The triad content of atactic 1-butene polymer component a) was obtained by integrating the are of the peaks from 26.92 ppm to 26.43 ppm.

The side chain methylene region of PB spectrum was fitted using the routine for deconvolution included in the Bruker WIN-NMR program. The mmmm pentad and the pentads related to the single unit error (mmmr, mmrr and mrrm) were fitted using Lorenzian lineshapes, allowing the program to change the intensity and the width of the lines. As a result the relative intensities of those signals were obtained. These results were used for the statistical modelling of pentad distributions using an enantiomorphic site model, in order to obtain the complete pentad distribution, from which the triad distribution is derived.

Infrared crystallinity was determined from the infrared absorption spectrum of about 1 mm thin film of the polymer by using the absorptions A at 1221 cm$^{-1}$ and 1151 cm$^{-1}$ in the equation:

$$\text{crystallinity} = \frac{\left(\frac{A_{1221}}{A_{1151}}\right)_{solid} - 0.76}{5.43 - 0.76}$$

The equation is described in Chem. of High Polymers (Japan) 19, 667 (1962) by Nishioka and Yanagisawa.

The 1-butene polymer composition object of the present invention can be easily fractionated by subjecting the composition to fractionation with xylene according to the procedure described below (Xylene solubles at 0° C.). In this way the atactic component a) remains in solution, while the isotactic component b) is insoluble at 0° C. When the composition is subjected to diethyl ether extraction the atactic component a) that taken alone results to be completely soluble in this solvent, cannot be completely separated from component b). Without wishing to be bound by a theory we believe that this can be explained by the fact that component a) and component b) are so intimately mixed that diethyl ether is not able to swell the component b) lamellas so that to be able to contact and solubilize all the component a) present in the composition. On the contrary when the composition is subjected to xylene fractionation according to the procedure described below, since all the composition is solubilized, with a subsequent precipitation of component a) the separation is complete.

This fact confirms that component a) and component b) of the 1-butene polymer composition of the present invention are completely intimately dispersed allowing the composition to maintain the best properties of the two components. In fact, for example, the composition retains the melting point of component b).

The following examples are give for illustrative purpose and do not intend to limit the present invention.

EXAMPLES

Xylene Solubles at 0° C.

A sample of 2.5 of the reactor composition prepared above was suspended in 250 ml of xylene previously distilled. The mixture was heated so as to reach the temperature of 135° C. in about 30 minutes while gently stirring under a light nitrogen flow. Once the temperature of 135° C. has been reached, to complete the sample dissolution, the mixture has been kept at 135° for another 30 minutes.

Once the dissolution step has been concluded, the solution was air-cooled under stirring till it reaches a temperature of about 100° C. The flask containing the solution was then placed in a Dewar vessel with a water and ice bath, so that the temperature inside the flask falls to 0° C. The solution is kept at 0° C. under stirring for 1 hour, so as to complete the crystallisation of the insoluble.

The obtained mixture was filtered through a short stem glass funnel and a quick filtering paper filter. If the filtrate is not completely limpid, the filtration is repeated. During the filtration step, the mixture is kept at 0° C. Once the filtration is finished, the filtrate has been balanced at 25° C., and then two 50-ml aliquots have been placed into two volumetric flasks.

One of the two 50-ml filtrate aliquots has been transferred into a previously calibrated aluminium pan (The aluminium pans are to be kept in a muffle furnace at 500° C. for 30 minutes before usage). The aluminium pan has been heated to 140° C. so to evaporate the solvent under a light nitrogen flow and, at the same time, collect and condense the evaporated solvent vapours. Once the solvent evaporation is completed, the pan has been placed in a vacuum (200-400 mbar) oven at 75-80° C. and under nitrogen flow so as to dry the content till constant weight (total soluble). This procedure has been repeated for the 50-ml second aliquot of filtrate.

In parallel an aliquot of 50 ml of xylene was subjected to the same evaporation procedure in order to have a blank reference.

The soluble fraction in o-xylene at 0° C. (total soluble) is expressed as a weight percentage with the following general formula:

$$XS\% = \frac{\left(\left(\frac{M_{r_1} + M_{r_2}}{2}\right) - \left(M_b \times \left(\frac{V_r}{V_b}\right)\right)\right) \times V_i}{M_i \times V_r} \times 100 \quad (1)$$

where the symbols stand for the following:
XS %=weight percentage of the total soluble fraction;
$M_{r_1}$=first aliquot residue on evaporation;
$M_{r_2}$=second aliquot residue on evaporation;
$M_b$=blank residue on evaporation;
$M_i$=starting sample weight;
$V_r$=evaporated solution volume;
$V_b$=evaporated blank volume;
$V_i$=starting solvent volume.

The insoluble fraction in o-xylene at 0° C. (total soluble) is expressed as weight percentage with the following general formula:

$$XI\% = 100 - XS\% \quad (2)$$

where the symbols stand for the following:
XI %=insoluble fraction weight percentage;
XS %=total soluble weight percentage.

Metallocene Compounds racemic and meso dimethylsilandiylbis-6-[2,5-dimethyl-3-(2% methylphenyl)cyclopentadienyl-[1,2-b]-thiophene] zirconium dichloride respectively (A-1) and (A-2) was prepared according to WO 01/44318.

Example 1

Catalyst System

The catalyst system C-1 was prepared according to the procedure described in "Example 1 Preparation of catalyst system C-1" of International Publication No. WO 2005/095468, by using 4.5 mg of a mixture of A-1 and A-2 1:1; Altot/Zr 200 and a ratio Methylalumoxane (MAO)/Triisobutylaluminum (TIBA) 2:1.

1-Butene Polymerization

A 4-L jacketed stainless-steel autoclave, equipped with a magnetically driven stirrer and a Flow Record & Control system is used All fluxes, pressure and temperatures into the autoclave are controlled via DCS PC. Before each test, the autoclave is cleaned with hot nitrogen (1.5 barg $N_2$, 70° C., 1 hour). Then, 1350 g of 1-butene and 6 mmol of Al(i-Bu)$_3$ (as a 1M solution in hexane) are charged at room temperature. Then, the autoclave is thermostated at the polymerization temperature, the solution containing the catalyst/cocatalyst mixture prepared above is injected into the autoclave through a stainless-steel vial by means of nitrogen pressure. The polymerization reactions are carried out at 70° C. for 1 h. Then, stirring is interrupted, and the pressure into the autoclave is raised to 20 bar-g with nitrogen. The 1-butene/poly-1-butene mixture is discharged from the bottom into a heated steel tank containing water at 70° C. The tank heating is switched off and a flow of nitrogen at 0.5 bar-g is fed. After cooling at room temperature, the steel tank is opened and the wet polymer collected. The wet polymer is dried in an oven under reduced pressure at 70° C. The polymerization conditions and the characterization data of the obtained polymers are reported in Table 1.

TABLE 1

| ex | activity kg/($g_{met}$*h) | I.V. dL/g (THN) | $M_w/M_n$ | $T_m$(II) ° C. | $\Delta H_f$(II) J/g | $\Delta H_c$(II) J/g |
|---|---|---|---|---|---|---|
| 1* | 98.7 | 1.4 | 2.0 | 106.5 | 19.12 | −18.3 |

*catalyst solution aged 24 hours

The reactor composition prepared as above was subjected to xylene extraction at 0° C. according to the procedure described above. The characterisation of the two fractions is reported in table 2.

TABLE 2

| | composition | NMR % | I.V. dL/g (THN) | $M_w/M_n$ | enthalpy ($\Delta H_f$). J/g | cristallinity (IR) | Tm ° C. |
|---|---|---|---|---|---|---|---|
| Ex 1 | comp a 43% | rr 29 | 1.4 | 2.0 | n.d. | 0.030 | n.d. |
| | comp b 57% | mmmm 98 | 1.4 | 2.0 | 32 | n.a. | 106.5 | n.d. not detectable
n.a. not available

A sample of the reactor composition obtained above was subjected to Soxhlet extraction with diethyl ether for 12 hours. The extract was evaporated in order to isolate the soluble fraction. This ether soluble fraction amounts to 28 weight %, it is fully atactic having a crystallinity (IR) of 0.024% in addition to be fully amorphous.

Examples 2-4

Preparation of the Catalyst System C-2 in a 20 Lt. jacketed reactor were charged at room temperature under nitrogen atmosphere 1130 g of a 110 g/Lt. triisobutyl aluminium (TIBA) solution in isododecane (1.48 L,) and 390 mL of a 30% wt./wt. methylalumoxane (MAO) solution in toluene The resulting alkyl mixture was stirred at 50° C. for 1 h. Then 8.6 g of a mixture of A-1 and A-2 (meso/rac=40/60) (12.3 mmol) were added at room temperature under nitrogen atmosphere into the reactor. After 1 h stirring at 50° C., toluene was removed by distillation under vacuum (5 mmHg). The obtained solution was then diluted with 0.96 Lt. (717 g) of isododecane to reach a concentration of total catalyst (A-1 and A-2 plus MAO plus TIBA) of 104 g each Lt. of solution. The resulting catalyst solution was discharged from the reactor and used as such. This catalyst solution was analysed and it resulted: $Al_{TOT}$/Zr=209 (theoretical value 203), Al=3.95% wt. (theoretical value 3.8), Zr=637 ppm (theoretical value 636). The concentration of the metallocene resulted to be 3.76 mg of A-1+A-2 for each mL of solution. The catalyst solution resulted composed of isododecane=86.19% wt., MAO=4.97% wt., TIBA=8.4% wt. and metallocene A-1+A-2=0.44% wt.

1-Butene Polymerization in the Pilot Plant

The polymerization was carried out in a pilot plant comprising two stirred reactors connected in series in which liquid butene-1 constituted the liquid medium. The catalyst system reported in table 3 was injected into the reactor at a feed rate of 8-10 g/h and the polymerization was carried out in continuous at a polymerization temperature of 65° C. Initially the plant was run without hydrogen, then, after a steady period of production, hydrogen (50 ppm in bulk), was fed into both reactors. All other process conditions were unchanged, aiming to asses the effect of hydrogen on the catalyst response.

The run without hydrogen, see example 2, showed a catalyst mileage about 3200 g/g and a Polybutene (PB 1) grade with IV of 1.6 dl/g and 20% wt of xylene soluble was produced. The main contribution to the production went from the first reactor with a split of 75% of the total production.

When hydrogen was fed, example 3, a catalyst mileage increase of 10-15% was observed as well as the contribution of the second reactor went up from 25% to 35%. The PB 1 grade produced under these conditions had a lower IV (1.4 dl/g) and an higher xylene soluble, stable at 30% wt. The molecular weight of the polymer was very stable and smoothly controlled.

The 1-butene polymer was recovered as melt from the solution and cut in pellets. The polymerization conditions are reported in table 3

TABLE 3

| | Ex | | | |
| | 2 | | 3 | |
| | 2-1 First reactor | 2-2 Second reactor | 3-1 First reactor | 3-2 Second reactor |
|---|---|---|---|---|
| Catalyst system | C-2 | | C-2 | |
| Residence time (min) | 144 | 88 | 140 | 85 |
| C4-feed (kg/h) | 86 | 50 | 80 | 50 |
| H$_2$ ppm mol | 0 | 0 | 50 | 55 |
| Split % wt | 75 | 25 | 65 | 35 |
| Yield g/g § | | 3200 | | 3600 |

§yield referred to total aluminium content g polymer/g Aluminum total

From table 3 it clearly results that the presence of hydrogen increases the activity of the catalyst, in particular (tables 3 and 4) it increases the activity of meso compound whilst racemo is affected only to a very minor amount. Moreover on the bases of the ratio of the productivity of the two reactors it is possible to conclude that in the presence of hydrogen the catalyst decay is lower. Some polymers obtained in examples 2 and 3 have been characterized, according to ISO 527-1 and ISO 178 the data are reported in table 4

TABLE 4

| | Ex | |
| | 2 | 3 |
|---|---|---|
| Xilene solubles at 0° C. % wt | 20 | 30 |
| IV (dl/g) | 1.6 | 1.4 |
| Flexural modulus (MPa) | 83 | n.a. |
| Stress at break (MPa) | 27.9 | n.a. |
| Elongation at break (%) | 453 | n.a. |
| melting point (° C.) | 105.9 | 105.7 | n.a. not available

The invention claimed is:

1. A process for producing a 1-butene polymer comprising the step of polymerizing 1-butene and optionally ethylene, propylene or at least one alpha olefin of formula CH$_2$=CHZ, wherein Z is a C$_3$-C$_{10}$ alkyl group, in the presence of a catalyst system obtained by contacting:

a) at least a metallocene compound of formula (Ia) in the meso or meso-like form:

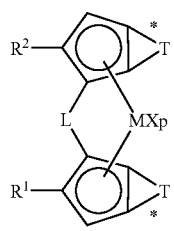

(Ia)

wherein

M is an atom of a transition metal selected from those belonging to group 3, 4, 5, 6 or to the lanthanide or actinide groups in the Periodic Table of the Elements;

p is an integer from 0 to 3, being equal to the formal oxidation state of the metal M minus 2;

X, same or different, is a hydrogen atom, a halogen atom, or a R, OR, OSO$_2$CF$_3$, OCOR, SR, NR$_2$ or PR$_2$ group, wherein R is a linear or branched, cyclic or acyclic, C$_1$-C$_{40}$-alkyl, C$_2$-C$_{40}$ alkenyl, C$_2$-C$_{40}$ alkynyl, C$_6$-C$_{40}$-aryl, C$_7$-C$_{40}$-alkylaryl or C$_7$-C$_{40}$-arylalkyl radicals; optionally containing heteroatoms belonging to groups 13-17 of the Periodic Table of the Elements; or two X can optionally form a substituted or unsubstituted butadienyl radical or a OR'O group wherein R' is a divalent radical selected from C$_1$-C$_{40}$ alkylidene, C$_6$-C$_{40}$ arylidene, C$_7$-C$_{40}$ alkylarylidene and C$_7$-C$_{40}$ arylalkylidene radicals;

L is a divalent C$_1$-C$_{40}$ hydrocarbon radical optionally containing heteroatoms belonging to groups 13-17 of the Periodic Table of the Elements or a divalent silylene radical containing up to 5 silicon atom;

R$^1$ and R$^2$, equal to or different from each other, are C$_1$-C$_{40}$ hydrocarbon radicals optionally containing heteroatoms belonging to groups 13-17 of the Periodic Table of the Elements;

T, equal to or different from each other, is a moiety of formula (IIb):

(IIb)

wherein the atom marked with the symbol * bonds the atom marked with the same symbol in the compound of formula (Ia);

R$^7$ and R$^8$, equal to or different from each other, are hydrogen atoms or C$_1$-C$_{40}$ hydrocarbon radicals optionally containing heteroatoms belonging to groups 13-17 of the Periodic Table of the Elements;

b) at least a metallocene compound of formula (Ib) in the racemic (rac) or racemic-like form:

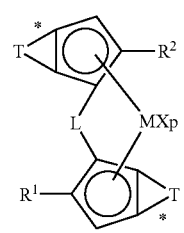

(Ib)

wherein the atoms marked with the symbol * bonds the atom marked with the same symbol in the moieties of formula (IIb); and c) an alumoxane or a compound that forms an alkyl metallocene cation, wherein 30 to 70 wt % of the 1-butene polymer is produced by the metallocene compound of formula (Ia) and 30 to 70 wt % of the 1-butene polymer is produced by the metallocene compound of formula (Ib).

2. The process according to claim 1 wherein the catalyst system further comprises d) an organo aluminum compound.

3. The process according to claim 1 wherein in the compounds of formula (Ia) or (Ib), M is titanium, zirconium or hafnium; X is a hydrogen atom, a halogen atom or a R group; L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylene radical containing up to 5 silicon atoms; $R^1$ and $R^2$ are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements.

4. The process according to claim 1 wherein in the compound of formulas (Ia) and (Ib), $R^8$ is a hydrogen atom or a linear or branched, saturated or unsaturated $C_1$-$C_{20}$-alkyl radical; and $R^7$ is a hydrogen atom or a $C_1$-$C_{40}$-alkyl, $C_6$-$C_{40}$-aryl or a $C_7$-$C_{40}$-arylalkyl radical.

5. The process according to claim 4 wherein $R^7$ is a group of formula (III):

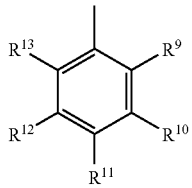

(III)

wherein $R^9$, $R^{10}$, $R^{11}$, $R^{12}$ and $R^{13}$, equal to or different from each other, are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; optionally containing heteroatoms belonging to groups 13-17 of the Periodic Table of the Elements.

6. The process according to claim 1 wherein a ratio between the racemic or the racemic like form (the compound of formula (Ib)) and the meso form or the meso-like form (the compound of formula (Ia)) ranges from 10:90 to 90:10.

7. The process according to claim 1 wherein the compounds of formulas (Ia) and (Ib) have respectively the following formulae (Va) and (Vb):

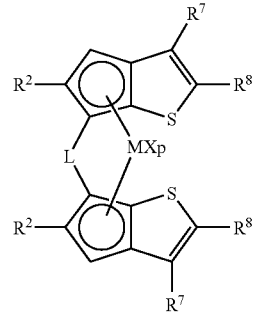

(Va)

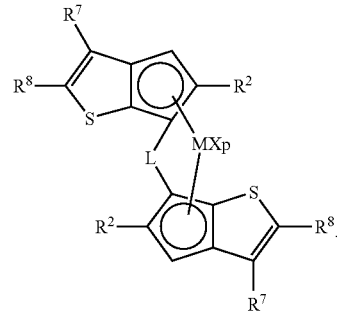

(Vb)

8. The process according to claim 1 wherein the process is carried out in the presence of hydrogen or ethylene.

9. The process according to claim 8 wherein the process is carried out in the presence of a hydrogen concentration ranging from 1 ppm to 1000 ppm.

10. The process according to claim 1 comprising the step of polymerizing 1-butene and propylene or at least one alpha olefin of formula $CH_2$=CHZ, wherein Z is a $C_3$-$C_{10}$ alkyl group.

11. The process according to claim 1 wherein the polymerization process is carried out by using liquid 1-butene as a polymerization medium optionally in the presence of ethylene, propylene or at least one alpha olefin of formula $CH_2$=CHZ, wherein Z is a $C_3$-$C_{10}$ alkyl group in an amount ranging from 0.1 to 8% by weight.

12. The process according to claim 1 wherein 1-butene homopolymer is produced.

* * * * *